Sept. 28, 1965    H. FASOLA, JR    3,209,365
INTERMITTENTLY OPERATED INKING MECHANISM
Filed July 29, 1963
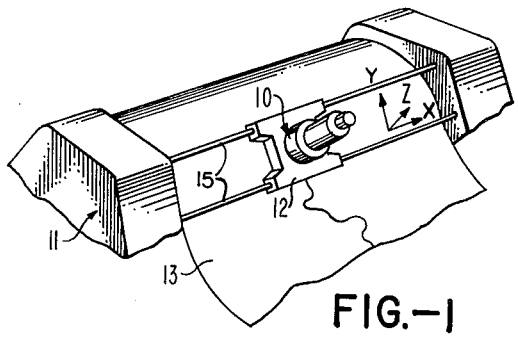
FIG.—1
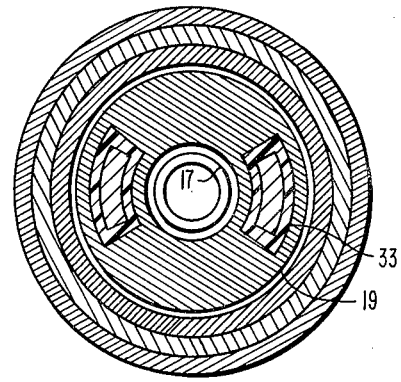
FIG.—4
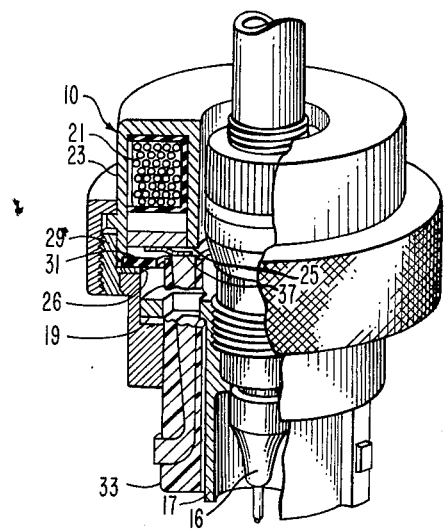
FIG.—2
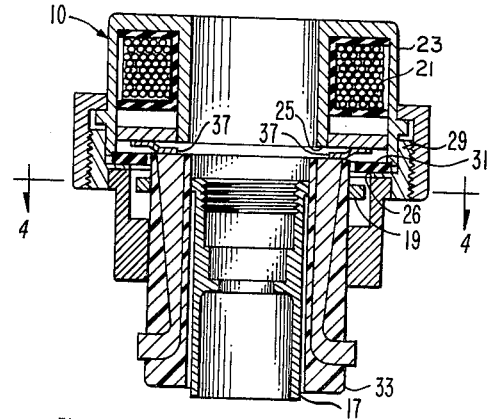
FIG.—3
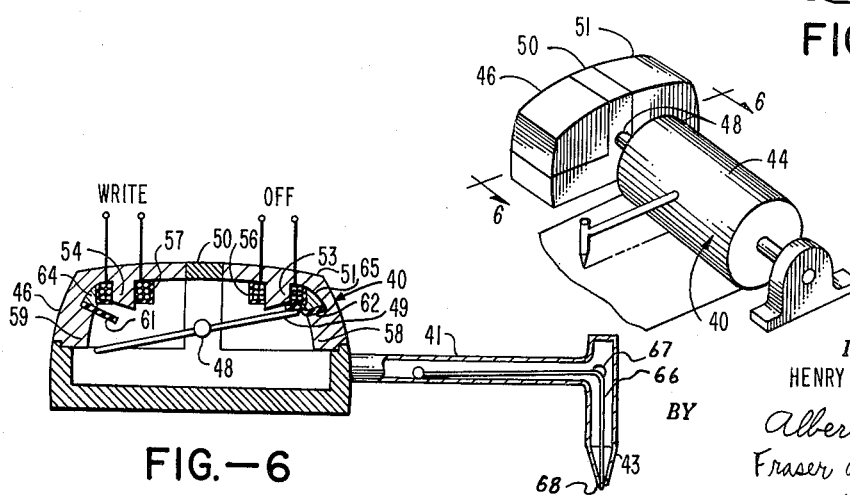
FIG.—5
FIG.—6
*INVENTOR.*
HENRY FASOLA, JR.
BY
Albert Rosen
Fraser and Bogucki
ATTORNEYS

United States Patent Office 3,209,365
Patented Sept. 28, 1965

3,209,365
INTERMITTENTLY OPERATED INKING MECHANISM
Henry Fasola, Jr., Los Angeles, Calif., assignor to California Computer Products, Inc., Anaheim, Calif., a corporation of California
Filed July 29, 1963, Ser. No. 298,354
6 Claims. (Cl. 346—140)

This invention relates to plotting systems and devices and is of particular application to recording instruments which must be intermittently moved toward and away from the medium on which they record.

The principal problems involved in the satisfactory operation of plotting systems derives from the operation of the ink pen or other recording mechanism which is used. A well defined indelible trace is necessary for virtually all records, and an ink pen or ballpoint mechanism is used for virtually all plotters except for those which operate at such high speeds that different technologies must be utilized. Despite refinements in the art of pen instruments, there are many problems associated with their use in plotting systems, particularly under more demanding circumstances of use, such as during high speed intermittent operation. Apart from running dry, due to failure of the ink supply, these mechanisms very often may run dry due to internal coagulation, or may blot or tear the recording paper, or may even become damaged in normal operation because they are extremely fragile. While special recording instruments may be made for these uses, the increased cost militates against their widespread and general usage.

The specific problem with which the present invention is concerned relates to the use of standardized reliable inking pen designs in high speed, intermittently actuated plotters. Standardized pen designs of the types referred to are those such as are sold under the "Rapidograph" and "Acetograph" trademarks and manufactured by the Koh-I-Noor Company. These pens have an internal cleaning wire extending through the hollow tip which engages the record medium. Ink may be fed from a refillable reservoir through the pen mechanism and through the pen tip to the paper. The cleaning wire has an attached weight, so that axial movement of the pen causes an internal movement of the cleaning wire within the tip which results in the fracture of ink clots and therefore releases ink for a free flow. This type of pen is noted for its uniformity and consistency of flow, and for the readily interchangeable tip structures which may be utilized, as well as for the relatively high volume ink supplies which they provide. After a long period of non-use, the pen may be prepared for reuse simply by movement of the cleaning wire within the tip to restore full flow.

The type of modern high speed plotter which places particularly severe demands on plotting instruments is that which is known as the digital incremental plotter, which operates at high speed in response to commands from a data processing system or a digital tape transport or other storage system. In this type of plotter, movement of a carriage mounting the pen recording instrument, relative to the record medium on X and Y axes, is achieved in equal increments or steps which may be effected separately or simultaneously. The pen may be raised or lowered into contact with the record medium by actuation of an electromechanical system mounted on the pen carriage and moving with the pen in the Z axis digital plotter systems capable of two or three hundred X and Y axis steps per second, and of ten or more Z axis movements of the recording instrument per second are in widespread use.

With these plotters, however, a repetitive series of commands in which the pen instrument is moved up and down is apt to disrupt the flow of ink with most types of inking instruments, including the type which uses the internal cleaning wire. With this latter type of inking instrument, for example, a sharp withdrawal of the pen from the record medium during the Z axis movement results in acceleration of the cleaning wire away from the paper, often at such speed that when the pen instrument is suddenly stopped the wire and attached weight continue their travel and a bubble of air is drawn into the tip. Movements of the recording instrument in this fashion along the Z axis, with attendant drawing of air, results in writing gaps where air, rather than ink, blows out of the pen. In addition, the repeated shocks may ultimately overstress the instrument.

It is therefore an object of the present invention to provide an improved recording device for a plotter system, in which standard highly reliable drafting pens having interchangeable tips may be utilized.

Another object of the present invention is to provide an improved system for reliably operating a recording instrument in a digital incremental plotter.

The present invention satisfies these and other objects by providing a structure in which a standard inking instrument may be mounted, and in which the inking instrument is moved away from the recording medium with high acceleration but without abrupt deceleration. In one arrangement in accordance with the invention, both mechanical and magnetic means are utilized in controlling the deceleration so as to avoid abrupt accelerational discontinuities. A magnetic structure, including a mechanical cushioning element, is provided such that a high, but controlled, initial acceleration is attained, but further acceleration is thereafter limited, and deceleration is augmented by the mechanical cushioning.

Specifically, in one example a standard inking instrument may be mounted in a magnetic armature which is movable in the direction away from the recording medium, that is, along the Z axis normal to the recording medium, under the control of a solenoid coil. The inking instrument and the armature may be returned to the recording medium solely by the force of gravity by the de-energization of the solenoid coil. The solenoid coil is provided with a magnetic housing member which substantially but not completely encompasses the coil, and which has concentric inner and outer pole tip surfaces defining an inner annular chamber within which the armature can move in the Z direction. The inner pole tip surfaces are spaced radially within the outer circumference of and above the armature, so as to be closely adjacent to the armature when the armature is fully in the up position. The outer pole tip surfaces are spaced radially outward from the outer circumference of the armature and are disposed substantially below the inner pole tip surfaces so as to be slightly above the armature when it is in the down position and below it when it is in the upper position. An annular cushion washer is mounted on the solenoid housing adjacent to the outer pole tip surfaces, and in the path of the armature as it moves upwardly from the down position past the outer pole tip surfaces. Thus, when the solenoid coil is energized, the armature moves upwardly, drawing the inking instrument rapidly away from the recording medium due both to the attraction of the inner pole tip surface and the strong attraction exerted by the closely adjacent outer pole tip surfaces. After a short distance, however, the upper periphery of the armature is aligned with the outer pole tip surfaces, so that the sole upwardly attracting force is exerted by the inner pole tip surfaces and the acceleration rate is thereby decreased. Furthermore, the armature encounters the resilient cushioning washer, thus decelerating the armature until it assumes the full up position closely adjacent to, but not actually in contact with, the inner pole surfaces.

This arrangement has particular advantages, in that the armature is internally configured to receive a standard inking mechanism of the type using an internal cleaning wire. Thus these inking mechanisms are interchangeable through the solenoid coil and the armature, and any normally available tip width which is desired may be used. Furthermore, a uniform mechanical motion is imparted at high speed, but without the sudden deceleration which causes air to be drawn into the writing instrument during up and down movements of the inking mechanism.

A better understanding of the invention may be had by reference to the following description, taken in conjunction with the accompanying drawings, in which:

FIG. 1 is a perspective view showing the mechanism in accordance with the invention as used with the principal elements of a digital incremental plotter;

FIG. 2 is a detailed perspective view partially broken away, of an inking mechanism in accordance with the invention;

FIG. 3 is a side view, taken in section of the principal elements of the mechanism of FIG. 1;

FIG. 4 is a plan view of the arrangement of FIGS. 2 and 3 taken through line 4—4 of FIG. 3;

FIG. 5 is a perspective view of another arrangement in accordance with the invention; and FIG. 6 is a partially broken away side view, taken in section along line 6—6, of the arrangement illustrated in FIG. 4.

An inking mechanism 10 in accordance with the invention is shown generally in FIG. 1 and in detail in FIGS. 2 to 4. This mechanism 10 is mounted on a movable carriage 12 of a digital incremental plotter 11 which may be controlled in the X, Y and Z axis directions relative to a recording medium such as paper 13. The plotter 11 may be one, for example, that is connected to receive writing signals from a digital computer (not shown). Since such plotters are well known, a detailed description need not be provided here. In response to +X, −X, +Y or −Y, control signals, a relative movement may be effected of the inking mechanism 10 in incremental steps on either the X or Y axes, or on both axes simultaneously, at high speeds. Because the steps chosen may be relatively small, the plots which are prepared may be continuous, discontinuous or may have any arbitrary form with a relatively high degree of resolution of individual curve segments. Discontinuous patterns may be provided by appropriate withdrawal of the inking mechanism 10 from the recording paper 13 under Z axis control signals. When, as described above, sequence of commands necessitates a number of withdrawals from and returns to the recording paper 13 within a short period of time, inking mechanisms according to the prior art may not operate properly. As will be described, the inking mechanism of the present invention is free of this problem.

It is preferred to employ a standard drafting instrument for inking purposes, such as an inking pen instrument using the internal cleaning wire and weight construction previously mentioned, one type of which is sold by the Koh-I-Noor Company under the trade names "Rapidograph" and "Acetograph." By using the standardized external threading on such pens, a standard pen holder may be utilized and a wide variety of point sizes and configurations may be interchanged at will simply by withdrawing one and threading in another. Furthermore, the pens may utilize replaceable ink cartridge constructions so that they may readily be reloaded as well as interchanged, and provide large ink supplies.

As illustrated in FIG. 1, the carriage 12 on which the inking mechanism 10 is mounted by means described hereinafter is supported on and movable along stationary transverse rod elements 15. In this instance, the recording paper 13 itself is moved along what may be regarded as the Y axis while movement of the carriage along the stationary transverse rods 15 constitutes movement on the X axis. However, through the use of a flat bed for the recording paper 13, and through the use of a movable mechanism for controlling the position of the inking mechanism 10 and the carriage 12 in the Y direction, the same plotting ability may be achieved. In this instance, the Z axis control is significant, the Z axis being defined as the axis normal to the recording paper 13, and movements being in the up and down direction, regardless of the position or relative attitude of the plotter 11.

Referring now to FIG. 2, within the inking mechanism 10, a standard drafting pen 16 is retained in a suitable internally threaded magnetic armature 17; this armature 17 is positioned along and concentric with the Z axis of the plotter assembly. The magnetic armature 17, shown in FIGS. 2 and 3 in the "down" or writing position, includes a circumferential upper flange 19 which is concentric with the Z axis. On and above the magnetic armature 17 is a solenoid coil 21, also disposed concentric with the central Z axis. The magnetic flux path about the solenoid coil 21 is defined principally by a magnetic housing 23 which is disposed concentric with the coil 21 and which principally encompasses the coil. The magnetic housing terminates in a pair of annular pole tip surfaces 25 and 26, an inner one 25 of which faces downwardly toward the magnetic armature. The inner pole tip surface 25 is within and in facing relation to the upper flange 19 of the magnetic armature 17. The outer pole tip surface 26 has an inner circumference which is at a greater radius from the central axis than the outer circumference of the upper flange 19, of the magnetic armature 17. The outer pole tip surface 26 is also disposed below the inner pole tip surface 25, relative to the Z axis, but when the magnetic armature 17 is in its down position, as illustrated in FIGS. 2 and 3, this outer pole tip surface 26 is slightly above the outer periphery of the flange 19.

The pole pieces are here illustrated as being made of two separate parts. The outer pole tip surface may be attached as a separate member 29 to the principal portion of the solenoid housing 23, and may thereby retain a resilient cushion washer 31 made of a suitable nonmagnetic material, such as a polyethylene plastic. This annular cushion washer is fixedly held between the solenoid housing 23 and the member 29, and has an inner diameter sufficiently small to protrude into the path of the upper flange 19 of the magnetic armature 17.

The magnetic armature 17 is slideably movable along the Z axis within a non-magnetic sleeve 33, preferably made of a moldable plastic such as one which is commonly sold under the trademark of "Delrin" by the Du Pont Company. Conductive leads 35 extend upward through the sleeve to the flexible contacts 37 to couple the external energizing signals from the carriage 12 to the coil 21.

This inking mechanism 10 is found in practical installations to be highly reliable and uniform in operation. For a down movement of the pin 16, the solenoid coil 21 depicted here is deenergized, and the pen and armature drop by gravity against the recording paper 13. If desired, for faster return of the pen to the paper or for the maintenance of higher writing pressure between the pen and the paper, a spring return may be added. For example, the spring return may be effected by adding resiliency to the cushion washer 31; the washer 31 may thus be provided with resilient tangs (not shown). Preferably, if a gravity return alone is used, a spacing on the order of $\frac{1}{16}$ inch is used between the up and down positions of the pen 16, so that the downward movement is executed with sufficient rapidity solely by the forces of gravity.

When an up command is provided to the plotter, the coil 21 is energized and thereafter remains energized, by conventional external circuits (not shown) until the next down command is received. Energization of the coil 21 establishes a high flux level in the solenoid housing 23, this flux level bridging the gap between pole tip surfaces 25 and 26 principally through the upper flange 19 in the magnetic armature 17. Both the magnetic construction and the mechanical construction contribute to imparting the desired acceleration and deceleration characteristics to the armature 17 holding the pen mechanism. Upon initial energization, a concentrated flux is generated in the solenoid housing 23, and the smallest gap between a pole tip surface and the magnetic armature 17 is found between the outer pole tip surface 26 and the outer circumference of the upper flange 19. Because the outer pole tip surface 26 is above the armature at this point in time, a high lifting force is applied to quickly accelerate the armature 17, with the pen 16, away from the recording paper 13. After separation is completed, however, acceleration is reduced, because in a short distance the upper flange 19 on the magnetic armature 17 is directly opposite the outer pole tip surface 26, and is therefore no longer upwardly urged by the attraction of the magnetic field from the outer pole tip surface 26. The sole attractive force urging the magnetic armature 17 upwardly past this point is therefore the inner pole tip surface 25, so that the amount of acceleration is diminished, even before the cushioning washer is reached. Also, as the upper flange 19 passes slightly above the outer pole tips 26 in its upward movement, additional mechanical and magnetic forces are introduced to tend to decelerate the armature 17. First, the upper surface of the flange 19 engages the under surface of the resilient cushion washer 31, thus introducing an increasing resistive force to the upward movement of the armature 17 as it approaches the inner pole tip surface 25. In addition, the attraction of the magnetic field from the outer pole tip surface 26 acts in opposition to the attraction of the inner pole tip surface 25, so that the armature speed in the upper direction decreases.

It should be noted that during the time that the outer flange 19 is moving upwardly and passing the outer pole tip surfaces 26, the degree of downward attraction exerted on the flange 19 by the outer pole tip surface 26 increases proportionately as the degree of coextensive relation of the outer pole tip surface to the outer flange 19 decreases. The upper limit of movement of the armature 17 along the axial direction is such that the uppermost portion of the outer pole tip surface 26 lies only slightly below the lowermost portion of the upper flange 19 when the magnetic armature 17 is fully raised to its uppermost position. Therefore, as the upper flange 19 rises above the outer pole tip surface 26, the magnetic armature approaches closer to the inner pole tip surface 25 and is subjected to an increasing attractive force from this element, which is counteracted not only by the mechanical force exerted by the cushion washer 31, but by the increasing downward attractive force from the outer pole tip surface 26 referred to. Accordingly, contact is made by the upper flange 19 at its upper limit in a relatively gentle manner. When the armature 17 is in the fully up position, it is slightly separated from the inner pole tip surface 25 so that magnetic remanence does not cause adherence of the armature 17 to the pole tip surface 25 when the solenoid 21 is deenergized.

This arrangement therefore has a great many advantages for use with speed plotting systems. Standard drawing mechanisms may be used, and the configuration permits the employment of a large ink supply, although the entire mechanism, including the pen instrument 16 with the ink supply separately, may be disassembled for easy cleaning. The external electrical connections need simply by unfastened from the protruding ends of the conductive leads 35 to permit this cleaning. By the same token, various point styles may be interchanged in the pen 16. It is found that in practical installations the more uniform lifting force and the deceleration of the armature 17 when approaching the fully up position provides a much gentler handling of the pen 16 and ink mechanism, eliminating the tendency to introduce air into the pen tip and substantially improving the performance of all sizes of pens.

A different arrangement in accordance with the invention is shown in FIGS. 5 and 6, in which magnetic driving is used for both directions of movement of a typical inking mechanism 40 for plotter systems.

This arrangement has an added advantage in that it avoids intermittent ink flow due to formation of ink crust. A crust of ink is often formed as a result of evaporation of ink vehicle during the time that the pen is raised away from the paper or other writing medium. In this arrangement, ink is drawn from a rotatable reservoir 44 to a formed pen tip 43 through a tube 41, containing an elongated ink flow control member in the form of a wire 66. The wire 66 is resiliently mounted within the tube 41. It should be noted that a small portion of the length of the wire 66 extends through and beyond the hollow tip 43. (In actual practice, the wire 66 extends about $\frac{1}{32}$ inch beyond the tip 43.) When the tip 43 is moved into contact with the paper, the end of the wire 66 is moved back fully within the hollow tip 43. The advantage of this is that any ink crust that may have formed on the tip 43 is broken off when the wire end retracts. The wire 66 is also provided with a small weight 67 so that any built-up crust can also be broken away from the point by shaking the whole pen assembly, thereby causing relative movement between the wire 66 and pen tip 43.

An actuator 46, which is mechanically coupled to the reservoir 44 (FIG. 5) by a rotatable shaft 48, may be selectively energized to rotate the reservoir in one direction to draw the pen tip 43 away from a recording medium, and in the other direction to return the pen tip 43 to the medium. Because of the great mass of the ink reservoir 44, the inking mechanism 40 is made rotatable about the central axis on which the reservoir is suspended. Therefore, positive control in moving the pen tip 43 both up and down must be assured since the force of gravity on the much lighter mass of the pen tip 43 and tube 41 may not be utilized. When it is desired to employ this mechanism for high speed operations involving many high speed movements of the tip 43 toward and away from the paper, the action of the tip must be exceedingly gentle in order to avoid damage to the tip and physical displacement of the ink in the tip. (While the pen movements depicted in FIG. 5 and 6 are described as controlled by electromagnetics for both up and down motions, it will be realized that a spring can be used for one of these two movements.)

Therefore, mechanisms in accordance with the invention provide an actuator 46 with a magnetic rotary vane 49 fixedly attached to the shaft 48 and disposed within a housing 51 to act as an armature for controlling the rotational movement of the inking mechanism 40 in a particular direction. The housing 51 is formed with two magnetic portions which provide inwardly protruding inner and outer pole tip pairs, each inner pole tip 53 and 54 having an actuating solenoid winding 56 and 57, respectively, wound thereon. The two pole tip pairs are magnetically isolated from one another by the nonmagnetic metal portion of the housing 51 which forms a strip 50 between the magnetic portions. Each outer pole tip 58 and 59 lies barely outside the radial paths of movement described by the opposite ends of the rotary magnetic vane 49 in moving from one position to the other to contact the beveled face of one or the other of the inner pole tips 53 or 54. Resilient cushion members 61 and 62 are mounted between the outer pole tips 58 and 59 and the associated inner pole tips 53 and 54, and are held in place by the non-magnetic inserts 64 and 65. Thus, when the vane 49 is rotated into engagement with one of the inner pole tips 53 or 54, it is first accelerated by the flux emanating from the associated outer pole tips 58 or 59 and then encounters the mechanical decelerating forces introduced by the associated cushions 61 or 62 and the magnetic decelerating force from the outer pole tip 58 or 59 just passed.

The ink mechanisms depicted in the arrangement of FIGS. 5 and 6 have been described with respect to writing in ink of one color only. However, the inking mechanism may be modified to write in inks of two different types or colors, without the necessity of changing the ink supply of the mechanism. This may be effected by having the vane 49 (FIG. 6) biased to a neutral position, out of contact with on pole pieces, by resilient members (not shown). In such a case, the two-pen mechanisms would have two tubes and tips, each similar to the tube 41 and tip 43 of FIGS. 5 and 6. The two tubes would extend from the ink mechanism 40 in diametrically opposite directions, with each pen having its own associated ink reservoir. In such a case, the energizing of one solenoid would cause a rotation of the shaft 48 effecting contact of one pen with the paper. A de-energization of that solenoid would cause a return of the pen to a neutral, non-writing position. Energization of the other solenoid would cause the opposite pen to write.

While there have been described above and illustrated in the drawings various forms of inking mechanisms in accordance with the invention, it will be appreciated that the invention may include a number of alternative forms, modifications, and variations, and the invention is to be construed to include all such forms, modifications and variations comprehended within the scope of the appended claims.

I claim:

1. An inking device for high speed plotting systems comprising a pen mechanism positioned to move along a selected axis, a solenoid coil mounted in concentricity with the axis, magnetic armature means detachably supporting the pen mechanism, a magnetic solenoid body mounted in fixed relation to the solenoid coil and encompassing the principal portion of the coil, the solenoid body having a pair of concentric pole tip surfaces, one of said surfaces being within the outer circumference of the armature and the other being outside the outer circumference of the armature, and a cushion member mounted on the solenoid body intermediate the pole tip surfaces and in the path of movement of the armature means.

2. The invention as set forth in claim 1 above, wherein the magnetic armature means has an upwardly disposed flanged surface in facing relation with the solenoid coil, and having a selected outer circumference, and in which the magnetic solenoid body has an internal pole tip surface within the outer circumference of the flanged surface and above the same, and the second pole tip surface is outside the outer circumference of the flanged surface and in approximate spaced apart relation above the armature when the armature is in its downward position and below the armature when the armature is in its upward position.

3. An inking device for high speed plotting systems comprising a pen mechanism, magnetic armature means coupled for movement with the pen mechanism, a magnetic solenoid body including inner and outer pole tip surfaces, said inner pole tip surfaces being disposed in the path of movement of the magnetic armature means, said outer pole tip surfaces being outside of the path of movement but adjacent said magnetic armature means, a solenoid coil disposed on said solenoid body and adapted to be actuated to provide opposite magnetic polarities to said inner and outer pole tip surfaces, and a mechanical cushioning member disposed between said inner and outer pole tip surfaces in the path of movement of the armature means, whereby the armature means is attracted past said inner pole tip surfaces toward said outer pole tip surfaces upon actuation of the solenoid coil.

4. In combination, a high speed signal responsive plotting system including a recording medium and an inking mechanism, said recording medium lying in an X-Y coordinate plane adjacent said inking mechanism, said inking mechanism being movable in the X and Y coordinate directions relative to said recording medium in response to electrical information signals and said inking mechanism being movable in the Z coordinate direction normal to the X-Y plane to selectively contact said recording medium, said inking mechanism including a pen mechanism, a magnetic armature means movable with said pen mechanism, a solenoid actuating coil, a magnetic member for mounting said solenoid coil having inner and outer pole tip surfaces exhibiting opposite magnetic polarities upon actuation of the solenoid coil, said inner pole tip surfaces being outside but closely adjacent the path of movement of the armature means, said inner pole tip surfaces being disposed in the path of movement of the armature means, and a yieldable non-magnetic member mounted between said inner and outer pole tip surfaces in the path of movement of the armature means as the armature means moves past said outer pole tip surfaces toward said inner pole tip surfaces.

5. In combination, a high speed signal responsive plotting system including a recording medium and an inking mechanism, said recording medium lying in an X-Y coordinate plane adjacent said inking mechanism, said inking mechanism being movable in the X and Y directions relative to said recording medium in response to electrical information signals and said inking mechanism being movable in the Z coordinate direction normal to the X-Y plane to selectively contact said recording medium, said inking mechanism including a pen mechanism, a rotatable magnetic armature means coupled to move the pen mechanism in the Z coordinate direction, a magnetic member providing inner and outer pole tip surfaces adjacent opposite ends of the rotatable magnetic armature means, said inner pole tip surfaces being disposed in the path of movement of the magnetic armature means and said outer pole tip surfaces being disposed outside but closely adjacent to the path of movement of the magnetic armature means as it rotates toward the respective inner pole tip surface, first and second solenoid coils mounted upon said magnetic body for providing opposite magnetic polarities to the inner and outer pole tip surfaces of each of said first and second pair of attracting said magnetic armature means, and nonmagnetic resilient members mounted on the magnetic body between each pair of inner and outer pole tip surfaces and disposed in the path of movement of the magnetic armature means.

6. An inking device for high speed plotting systems comprising a rotatable pen mechanism, a rotatable magnetic armature vane coupled for rotation with said pen mechanism, a magnetic member providing first and second inner and outer pole tip surfaces adjacent opposite ends of the armature vane, said inner pole tip surfaces being disposed in the path of movement of the armature vane and said outer pole tip surfaces being disposed outside but closely adjacent to the path of movement of the armature vane as it rotates toward the respective inner pole tip surface, first and second solenoid coils mounted upon said magnetic body for providing opposite magnetic polarities to the inner and outer pole tip surfaces of said first or said second pair for attracting said magnetic armature vane, and nonmagnetic resilient members mounted on the magnetic body between each pair of inner and outer pole tip surfaces and disposed in the path of movement of the armature vane.

References Cited by the Examiner

UNITED STATES PATENTS

| | | | |
|---|---|---|---|
| 1,155,501 | 10/15 | Moore | 346—141 |
| 2,267,411 | 12/41 | McNairy | 317—195 |
| 2,788,255 | 4/57 | Farber | 346—139 X |
| 3,016,612 | 1/62 | Lynott | 346—139 X |
| 3,046,456 | 7/62 | Petrus | 317—195 |
| 3,094,104 | 6/63 | Gauley | 120—42.06 |

FOREIGN PATENTS 432,967   4/48   Italy.

LEO SMILOW, *Primary Examiner.*